Feb. 4, 1947.  L. I. YEOMANS ET AL  2,415,269
MACHINE TOOL AND METHOD OF CONSTRUCTING THE SAME
Filed Dec. 26, 1942  7 Sheets—Sheet 2

INVENTORS
Lucien I. Yeomans
DeWitt Clausen
BY Parker, Carlson, Pitzner & Hubbard
ATTORNEYS

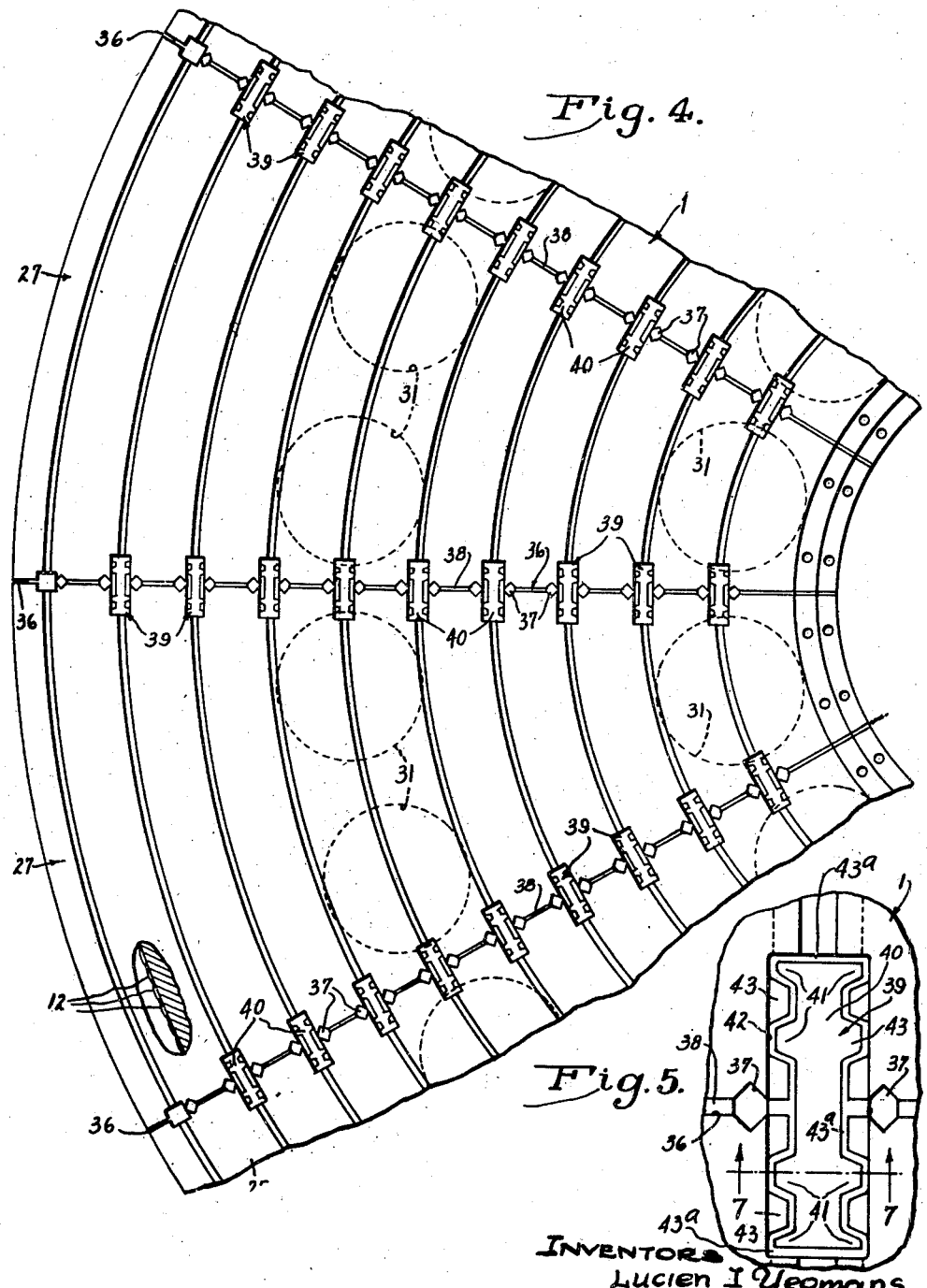

Feb. 4, 1947.   L. I. YEOMANS ET AL   2,415,269
MACHINE TOOL AND METHOD OF CONSTRUCTING THE SAME
Filed Dec. 26, 1942   7 Sheets-Sheet 4

INVENTORS
Lucien I. Yeomans
DeWitt Clausen
BY
Parker, Carlson, Pitzner & Hubbard
ATTORNEYS

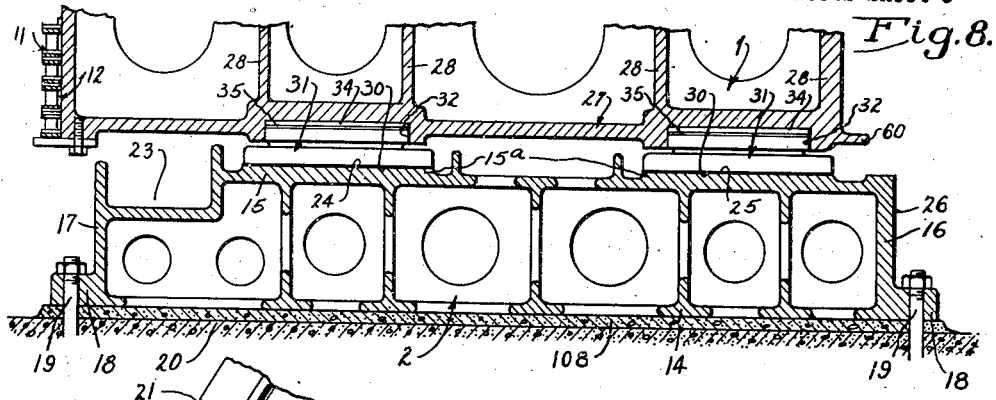
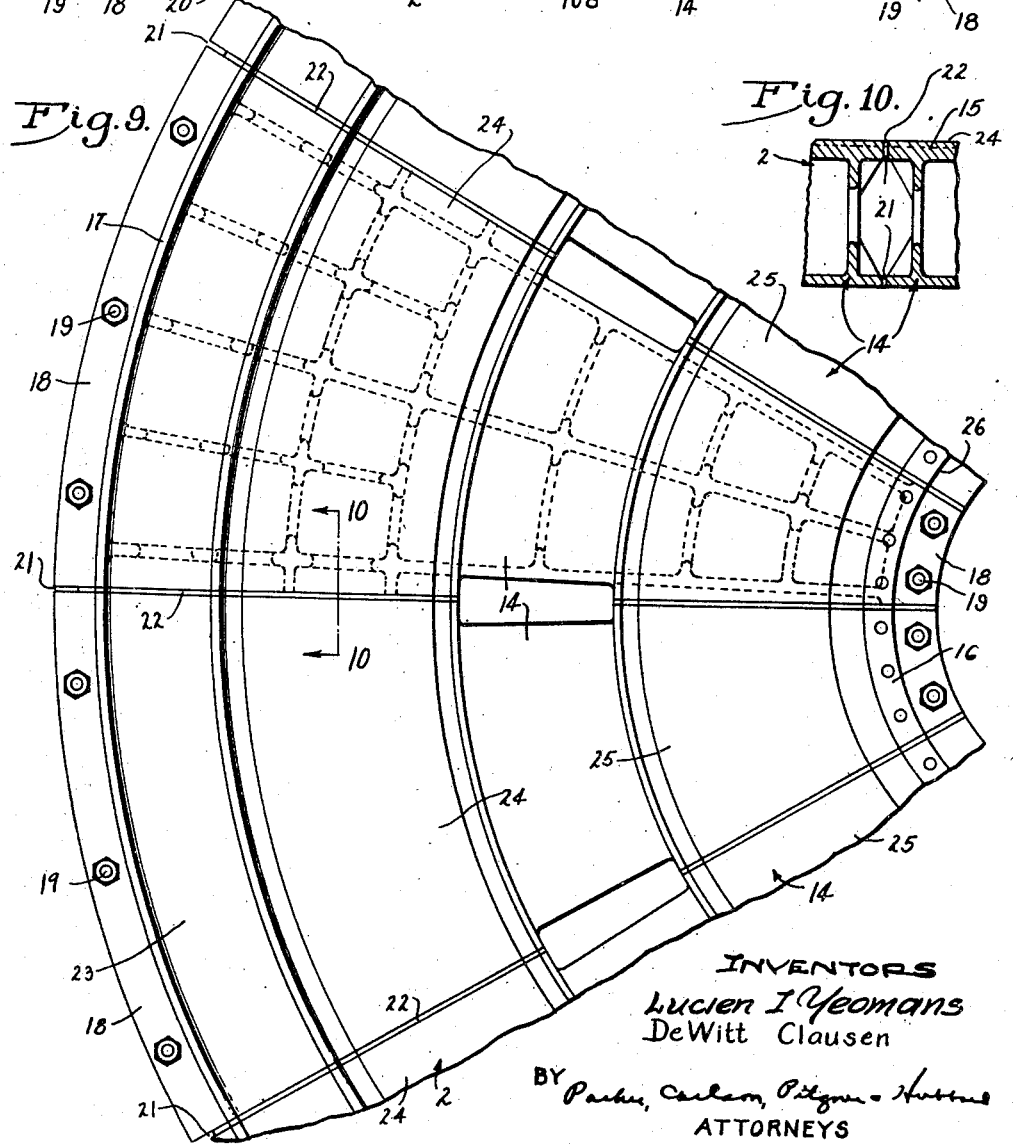

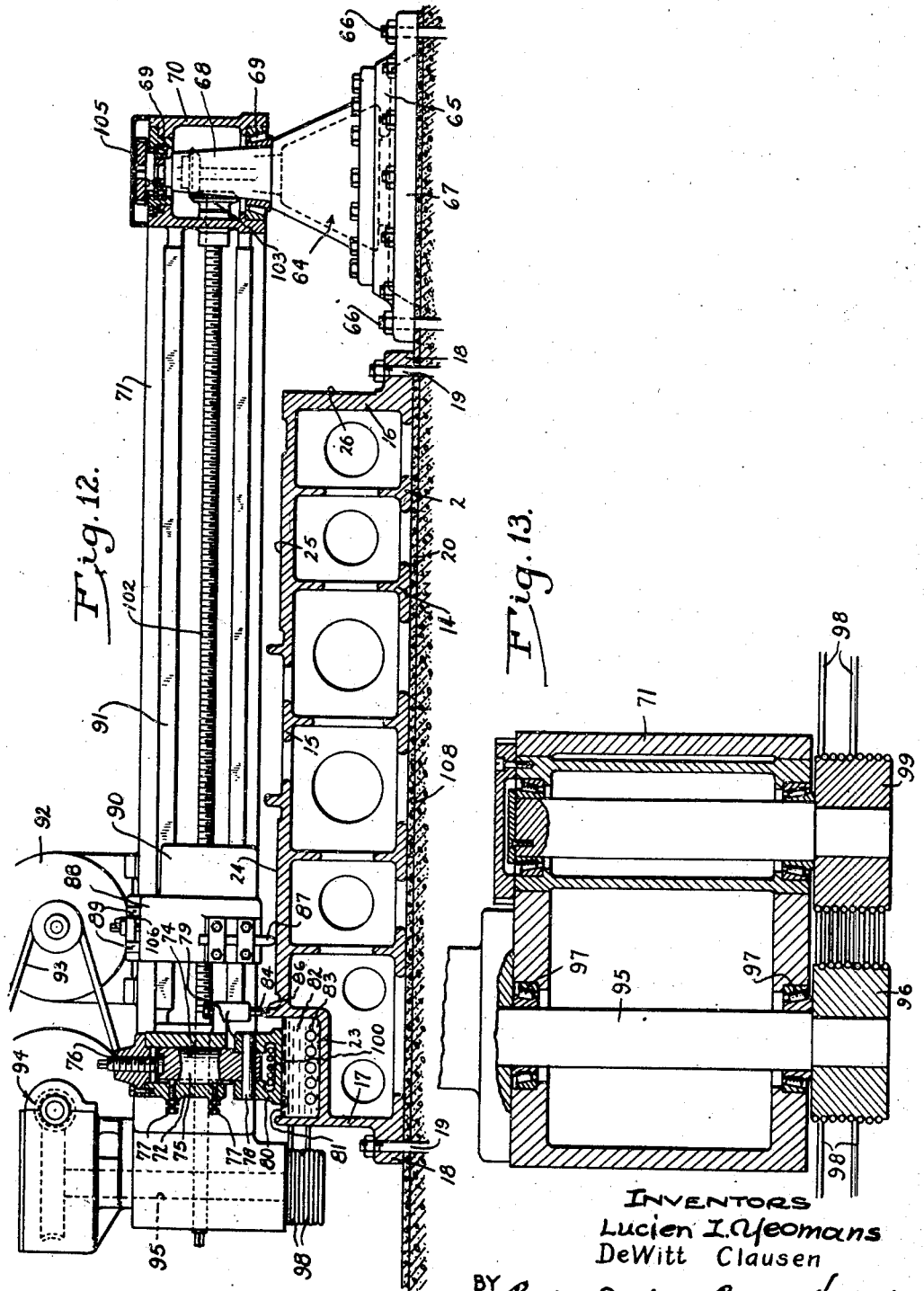

Patented Feb. 4, 1947

2,415,269

UNITED STATES PATENT OFFICE 2,415,269

MACHINE TOOL AND METHOD OF CONSTRUCTING THE SAME

Lucien I. Yeomans and De Witt Clausen, Chicago, Ill., assignors to Lucien I. Yeomans, Inc., Chicago, Ill., a corporation of Illinois Application December 26, 1942, Serial No. 470,261

21 Claims. (Cl. 90—58)

This invention relates generally to machine tools of the type having large tables on which work pieces are mounted while being operated on.

The general object is to provide a machine tool having a work table which is simple and inexpensive to build because of its novel sectional construction, which may be constructed and mounted largely in the location where the machine tool is to be used, which is supported ruggedly and accurately guided so as to permit precision machining operations to be performed on work pieces carried by the table.

Another object is to provide a machine tool work table and bed structure composed of a multiplicity of V-shaped segments.

A further object is to provide a novel means for supporting the work table from the bed structure.

Still another object is to provide a work table composed of segments connected in a novel manner to form a unitary movable structure.

A further object is to provide a novel bed and guide structure for supporting a work table of large size.

The invention also resides in the novel manner of constructing and assembling the table and its supporting structure.

Other objects and advantages of the invention will become apparent from the following detailed description taken in connection with the accompanying drawings, in which Figure 1 is a front elevational view of one form of machine tool in which the invention may be embodied.

Fig. 4 is an enlarged fragmentary plan view of the work table.

Fig. 5 is an enlarged fragmentary view of a portion of Fig. 4.

Fig. 8 is a fragmentary diametrical section of the table and its supporting bed.

Fig. 9 is a fragmentary plan view of the bed.

Fig. 10 is a section taken along the line 10—10 of Fig. 9.

Figure 11:
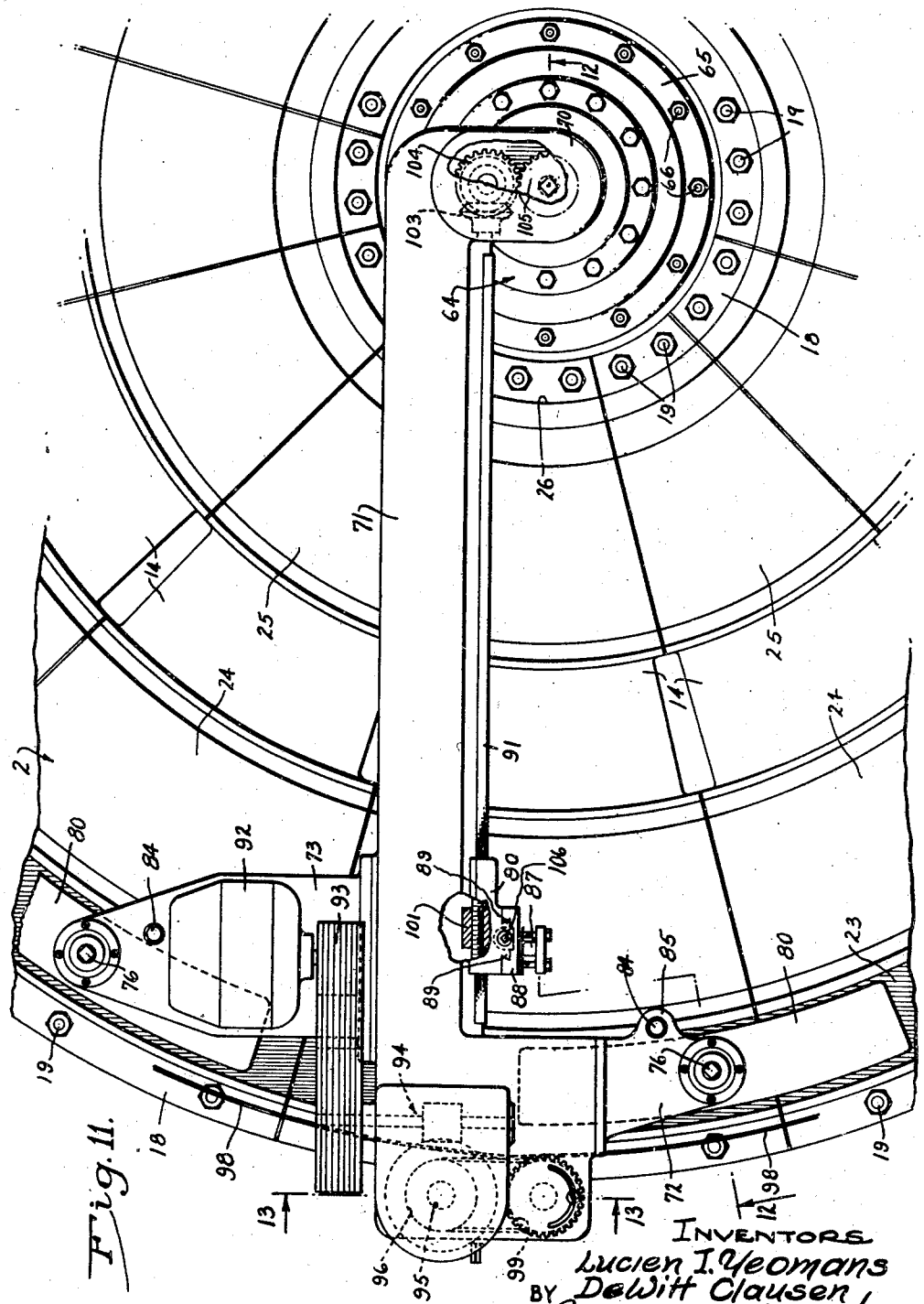
Fig. 11 is a fragmentary plan view of a temporary tool set up for machining the bed ways.

Figs. 12 and 13 are views taken respectively along the lines 12—12 and 13—13 of Fig. 11.

While the invention is susceptible of various modifications and may be practiced in various ways, we have illustrated in the drawings and will describe here in detail the preferred embodiment and method. It is to be understood, however, that we do not intend to limit the invention by such specific disclosure but aim to cover all modifications, alternative constructions, methods, and uses falling within the spirit and scope of the invention as expressed in the appended claims.

In the drawings, the invention is embodied for purposes of illustration in a so-called vertical boring mill having a circular horizontal table 1 of large diameter, for example fifty feet, supported by a bed 2, to turn about a vertical axis defined by a central post 3. In such machines, the table is disposed beneath a horizontal rail 4 adapted to be raised and lowered along column ways 5 and having ways 6 which support one or more tool heads 7 to slide horizontally. A boring tool or milling cutter may be mounted on a power driven spindle 8 carried by the head for axial adjustment. In this instance, the table is rotated by an electric motor 9 operating through a speed reducer to drive sprockets 10 that mesh with a chain 11 which also meshes with sprocket teeth 12 (Fig. 8) around the table circumference.

To facilitate construction and handling in shipment and assembly, the bed is composed of a series of segments 14, twelve in the present instance, arranged edge to edge to form an annulus. Each segment is a hollow casting webbed both radially and circumferentially as shown in Fig. 9 and having a substantially solid top 15 and inner and outer ends 16 and 17, the ends being formed with flanges 18 receiving bolts 19 by which the segments may be clamped individually against a concrete foundation 20 after being grouted in place in the usual way. The straight sides of the adjacent segments are separated by a narrow space 21 which allows for inherent variations in the widths of the castings. After mounting of the segments on the foundation, these spaces are filled with babbitt or other low melting point alloy 22 thereby adding to the rigidity of the bed structure.

Cast in each segment at the wider or outer end thereof is a channel 23 cooperating with the channels of the other segments, after filling of the spaces 21, to form a trough which is adapted to contain liquid for a purpose to appear later. The segment tops 15 have raised portions 15ᵃ (Fig. 8) which are machined accurately to form annular horizontal guide surfaces 24 and 25 for supporting the table 1. These surfaces, together with an internal cylindrical surface 26, are machined as will be described later after assembly of the bed segments and clamping of the same to the foundation.

Figure 2:
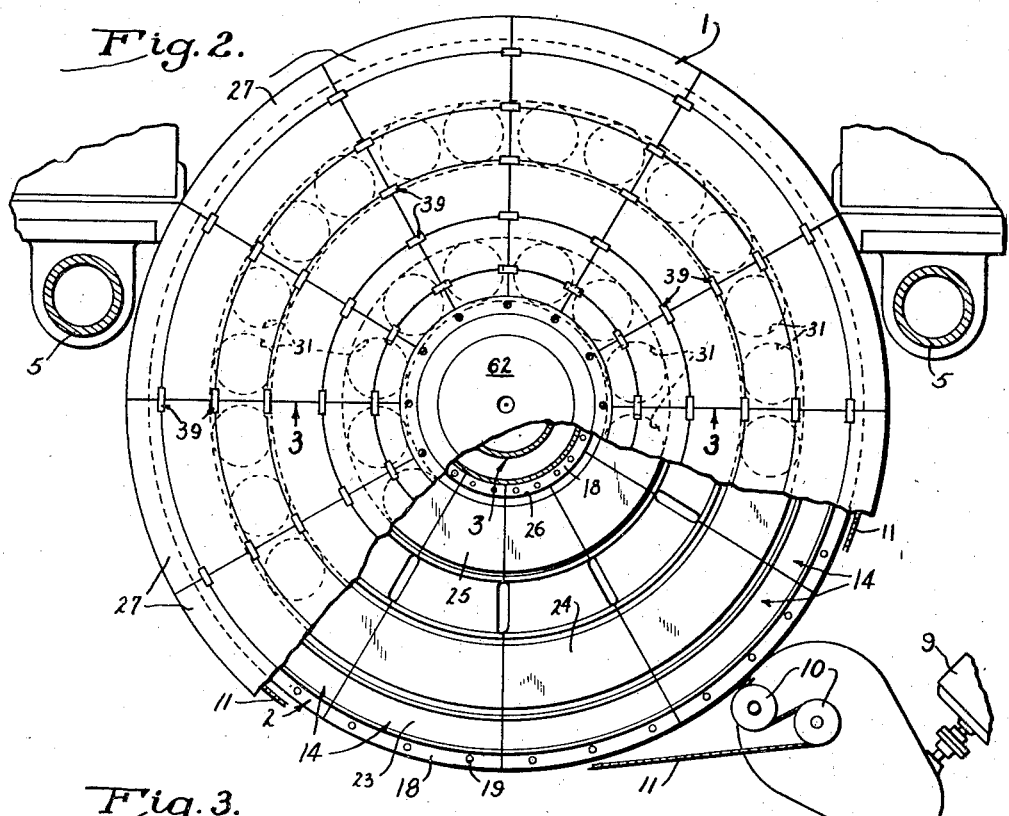
Fig. 2 is a plan sectional view taken along the line 2—2 of Fig. 1.
Figure 3:
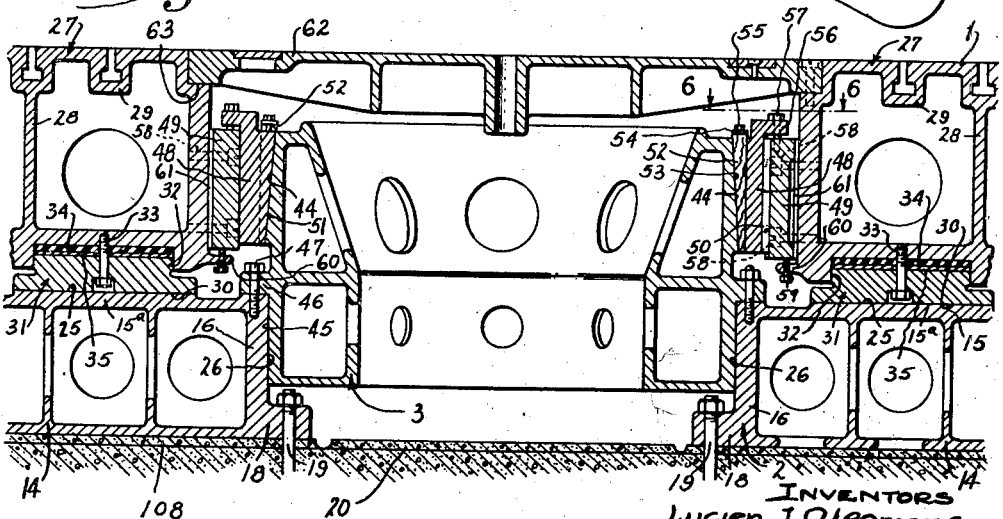
Fig. 3 is a section taken along the line 3—3 of Fig. 2.
Figure 6:
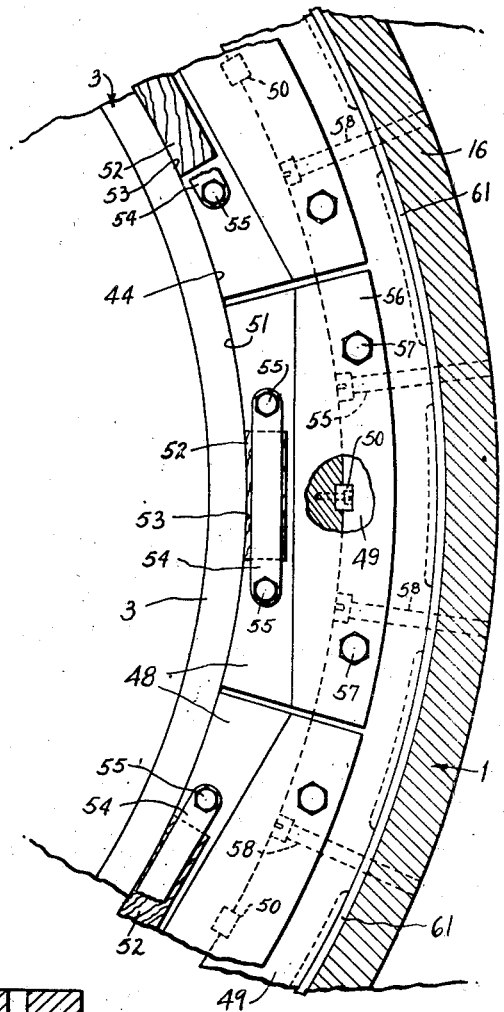
Fig. 6 is a fragmentary sectional view taken along the line 6—6 of Fig. 3.

To facilitate handling and shipment to the place of final assembly of the machine tool, the table 1 is also composed of a series of segments 27 (Figs. 2, 3 and 4) each comprising a hollow casting having continuous top and bottom walls connected by spaced webs 28 and also reinforced by shallower webs 29. Each table segment is supported on the bed ways 24 and 25 at three widely spaced flat areas defined by the bottom surfaces 30 of circular buttons 31 (Figs. 2, 4 and 8) projecting from the underside of the table and mounted thereon for some degree of universal movement whereby to permit the buttons to adapt themselves automatically to the bed ways. Herein, the upper portions of the buttons have peripheries machined to a slightly spherical contour fitting the bore 32 quite closely so as to prevent lateral displacement of the button relative to the table but permitting a slight degree of universal rocking motion of the buttons. A screw 33 entered loosely through each button holds the latter in the bore.

To provide the universal connection, the space between the closed end of the bore and the button is filled with yieldable or flowable material such as readily pliable synthetic rubber in the form of a layer 34 separated from the button by a thin metal disc 35 closely fitting the bore. Since material completely fills the bore and is non-compressible, the buttons may, when the table segment is placed on the bed, tilt slightly until their entire surfaces 30 come into full contact with the ways 24 and 25. In this way, the weight of each segment is sustained by the non-compressible material and is distributed uniformly to the button surfaces in the final assembly and this, without the necessity of locating the latter accurately relative to each other on the segment or in a common plane. Without interfering with the tilting of the button, the disk 35 serves to prevent the rubber from being squeezed out of the bore around the button.

Three buttons 31 are provided on each table segment, one being disposed on the center line of the segment near the narrow end so as to ride along the inner way 25. The other two ride the outer way 24 and are disposed on opposite sides of the center line. By employing three supporting areas each adapted to adjust itself automatically to its supporting way, the bores 32 need not be located and machined accurately except as to their diameter.

Figure 7:
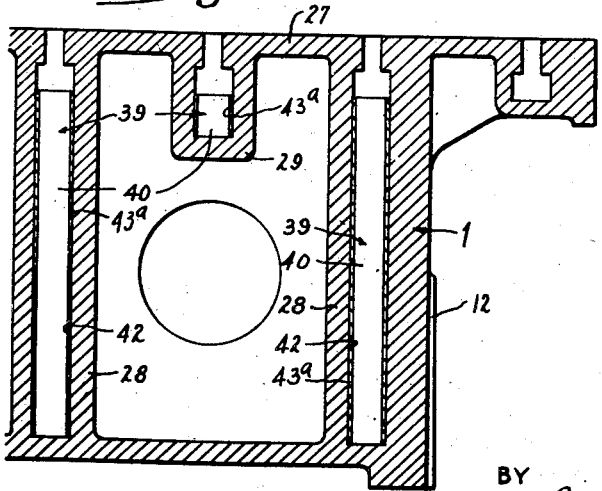
Fig. 7 is a fragmentary sectional view taken along the line 7—7 of Fig. 5.

The table segments are arranged edge to edge and when thus disposed on the bed are separated at their straight unmachined sides by a gap 36 which, after the insertion of packing in recesses 37, are closed by a filling 38 of babbitt or the like. At several points along each edge, each segment is rigidly connected to the adjacent segment by a novel key construction 39 which does not involve the machining of any surfaces. The keys include vertical bars 40 having a plurality of side ribs or enlargements 41 and disposed in vertically extending recesses 42 which are somewhat wider than the bars 40 and are formed with ribs 43 projecting into the grooves between the bar ribs 41. Each recess 42 terminates at the side of the segment in a slot which is narrower than the grooves between the ribs 43. These slots or open-sided channels are cast in the segments and each is positioned to register with the slot on the adjacent segment when the segments are assembled on the bed. After insertion of each key bar 40 in its recess 42, the space around it is filled with a molten low melting point alloy 43ᵃ, preferably type-metal which expands on cooling to complete the key and lock the segments rigidly together. The keys extend vertically along substantially the full height of the table segment webs 28 and of the shallower webs 29 (see Fig. 7). Thus, a unitary table assembly is formed without the necessity of machining any of the adjacent surfaces of the segments or fitting of the same in an accurate relation.

The table is rotatable about an external bearing surface 44 formed on the upper end of the post 3 which comprises a hollow reinforced casting having a machined external cylindrical surface 45 at its lower end received with a tight expansion fit into the central recess defined by the cylindrical surface 26 of the segmental bed 2. A flange 46 on the casting rests on the bed segments and is clamped against the latter by cap screws 47. The bearing surface 44 is preferably tapered slightly and fits in an internal bearing surface on the table. In the present instance, this latter surface is formed by an annular series of arcuate metal shoes 48 arranged end to end around the machined interior of a ring 49 and individually connected to the latter by vertical keys 50. The bearing surfaces 51 of the shoes are interrupted by wooden blocks 52 received in channels in the metal blocks and having surfaces 53 fitting against the surface 44, both metal and wood surfaces being tapered to conform to the surface 44. Straps 54 overlie the blocks 52 and are clamped by screws 55 to the shoes 48. Flanges 56 on the shoes 48 overlie the ring 49 and carry screws 57 by which the shoes may be adjusted axially relative to the ring and along the keys to take up any looseness in the bearing and insure a very close fit. Such a fit is made possible through the use of the wooden or non-metallic bearing surfaces 53 which, in spite of the closeness of the fit, prevent the metal surfaces 44 and 51 from freezing together.

The ring 49 (Fig. 3) is connected rigidly to the table in a novel manner that avoids the necessity of providing interfitting machined surfaces on the two. To this end, cap screws 58 extend radially through the ring and thread into the end wall of each table segment 27 thereby holding the two against relative turning. The ring 49, being smaller than the rough wall surface of the segment end, leaves a gap between the opposed rough surfaces. While the ring is held centered and adjustably supported vertically by screws 59 entered through flanges 60 on the table segments, molten type metal is flowed into the gap after proper packing of the latter. This metal cools to form a filling 61 which coacts with the screws to form a rigid joint between the ring and table. The central recess in the table is covered by a cast disk 62 seating on shoulders 63 of the table segments.

The bed and table constructed as above described not only minimize the amount and accuracy of machine work required on the sectional parts, but also enable the parts to be fitted together and connected at the place where the machine tool is ultimately to be used. This method of assembly is made possible by the novel way in which the table supporting and guide surfaces 24 and 25 and the internal bed wall 26 are formed with the required precision by means of the temporary tool set up shown in Figs. 11, 12, and 13 after the initial assembly of the bed segments 14 on the foundation 20. This set up comprises a pedestal 64 rising above the bed 2 and mounted in the bed recess with its base 65 supported by and clamped by bolts 66 to a foundation 67. The upper tapered end 68 of the pedestal carries tapered roller bearings 69 whose outer raceways are on a short offset end 70 of a rail 71 of a length greater than the radius of the bed. The outer end of the rail carries two brackets 72 and 73 each having a vertical bore 74 in which a plunger 75 is slidable. By manually turning a screw 76 which supports the plunger, the latter may be adjusted vertically relative to the rail and then clamped by tightening screws 77 that enter a keyway in the plunger.

At its lower end, each plunger carries a crosspin 78 pivotally connected to lugs 79 upstanding from the center of an elongated arcuate shoe 80 whose smooth flat bottom surface 81 is adapted to rest on the surface of a body of ice 82 frozen in the trough 23. The ice is produced by flowing refrigerant through a coil 83 disposed in the trough. While the water is being frozen, the outer end of the rail is supported by screws 84 threading through lugs 85 on the brackets 72 and 73 and bearing against a rib 86 on the bed.

The perfectly level and flat ice surface thus formed is utilized to support the outer end of the rail 71 and guide a tool 87 by which the bed way surfaces 24 and 25 are machined. This tool is clamped to a cross-slide 88 adjustable along vertical ways 89 on a slide 90 which is supported on and guided horizontally by ways 91 that extend along the rail 71.

Mounted on the rail bracket 73 is a motor 92 which through a belt 93 and worm gearing 94 drives a vertical shaft 95 carrying a drum 96 and journaled in a bearing 97 on the outermost end of the rail 71. Two cables 98 are wrapped around the drum 96 and a second drum 99 on the rail end for eccentric adjustment to take up any slack in the cables 98 which extend completely around the bed 2 and grip the latter frictionally. Thus, during operation of the motor 92, the rail 71 turns slowly around the pedestal 64, the outer end of the rail being supported at the adjusted height through the medium of the shoes 80 that slide along the ice surface. A coil 100 in each shoe is supplied with refrigerant from a unit (not shown) carried by the rail 71, the shoes being thus maintained substantially below the freezing temperature so as to avoid melting of the ice.

A nut 101 on the tool slide 90 threads onto a screw 102 carried by the rail 71 and having fast thereon at its inner end a bevel gear 103 rotatably mounted on the rail and rotatable with one of two intermeshing pick-off gears 104 and 105. The gear 105 is mounted rigidly on the rail concentric with the axis of the rail bearing. Thus, as the rail turns around the central axis, the screw 102 is turned thereby feeding the tool along the rail and across the surface 24 or 25 then being machined.

The vertical cylindrical surface 26 is bored by a tool of the proper shape mounted on the crossslide 88 and fed vertically by manually turning a screw 106 carried by the slide 90. During this operation also, the ice surface serves as the guide for the outer end of the rail.

The method of constructing and mounting the table 1 will be apparent from the previous description and may be summarized as follows. It consists first in casting the separate bed and table segments 14 and 27 and the post 3. The latter, being a comparatively small piece, is turned externally to form the cylindrical surface 45 and the tapered bearing surface 44. No preliminary machining is performed on the bed sections, and the only operations on the table sections are the boring of the blind bottom holes 32.

All of the parts thus formed, including the temporary tool set up, are shipped to the location where the boring mill is to be installed and used. There the bed segments 14 are arranged edge to edge around the previously formed foundation in which the bolts 19 are anchored. After approximate levelling of the segments, grouting 108 is formed beneath and around the bed and the segments are clamped in their final location by the bolts 19. The pedestal 64 is similarly but temporarily mounted on the foundation. After the crevices between the bed segments have been filled preferably with metal, the trough 23 is filled with water which is frozen solidly by circulating refrigerant through the coil 83. The outer end of the rail 71 may be supported from the bed by the screws 86 during the freezing operation. After lowering of the rail shoes and adjustment of the tool 87, the surfaces 24 and 25 are machined as previously described, the central vertical surface 26 is next formed using the ice surface as the tool guide.

After dismantling and removal of the temporary tool set up, the post 3 is chilled and placed in the bed recess 26 so that it will expand therein and form a tight fit. Next, the table segments 27, each carrying the three buttons 31, are placed on the bed with the buttons resting on the guide surfaces 24 and 25 and adapting themselves to the latter under the weight of the segments, this being permitted by the fluid character of the supporting mediums 34. After filling the crevices between the table sections, the keys 39 are formed to connect the table segments after which the ring 49 is supported on the table by the screws 59, and the bearing segments 48 are mounted on the ring and adjusted to remove all looseness. The bearing is completed by flowing in the filling metal 61 between the ring 49 and the internal wall of the table.

Figure 1:
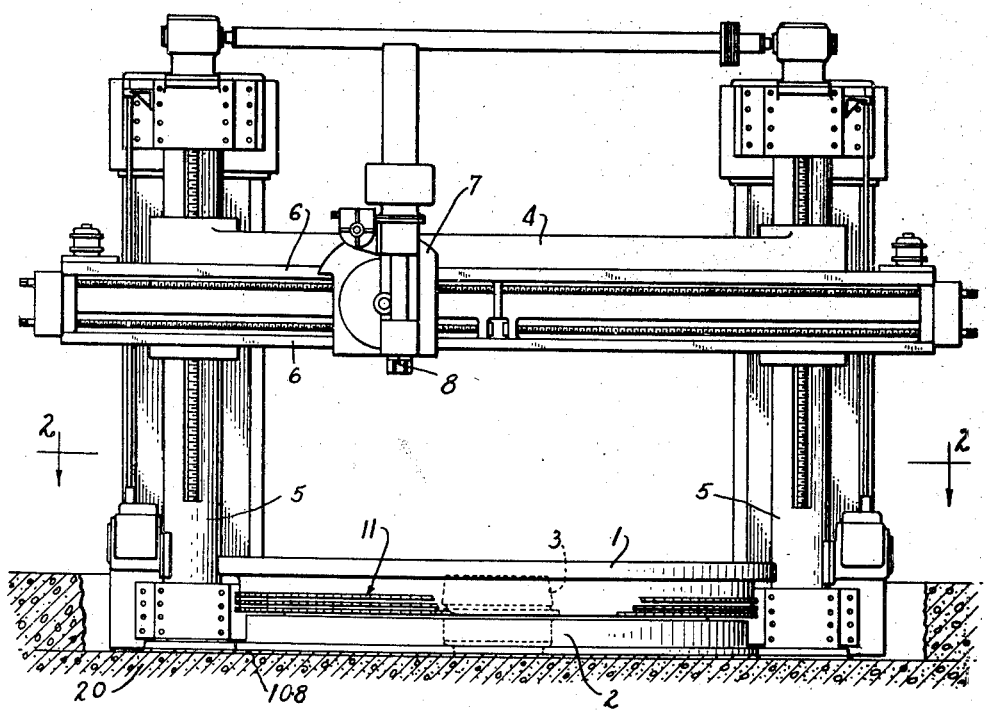

The table is now a unitary structure supported on the guide surfaces 24 and 25 to turn about a fixed vertical axis defined by the post 3. The final steps are the machining of the top surface of the table and the T-slots therein. The temporary tool set up having been dismantled, this may best be accomplished by using the final tool supporting structure of the boring mill itself and the table rotating mechanism driven by the motor 9. For example, a face milling cutter may be mounted on the vertical spindle 8 (Fig. 1) of one tool head 7 and brought into engagement with the rough top of the table while the latter is being rotated and the tool head is being fed radially along its supporting rail.

It will be apparent that the construction and method of assembly above described enable large size machine tools to be constructed at low cost and this without involving any difficulties in handling and shipment of the parts. At the same time, the table is adapted for precision work and may be made in sizes much greater than the tables of similar machine tools heretofore constructed.

We claim as our invention:

1. In a machine tool, the combination of a horizontal bed having a pair of annular concentric guideways formed on its top surface, an annular series of segments rigidly connected in edge to edge relation and each slidably supported at two spaced points by the outer one of said guideways and at one point by the inner one of said guideways, and a bearing guiding said segments for rotation of the segments around said guideways about a central vertical axis.

2. In a machine tool, the combination of a horizontal bed having a pair of annular concentric guideways formed on its top surface, a series of V-shaped segments rigidly connected in edge to edge relation to form an annulus, two angularly spaced members for each segment slidable along the outer one of said guideways and each mounted on the underside of the segment for universal tilting relative thereto, a third member for each segment slidable along the inner one of said guideways and mounted on the underside of the segment for universal tilting relative thereto, and a bearing guiding said segments for rotation of the segments around said guideways about a central vertical axis.

3. In a machine tool, the combination of a horizontal bed having guideways formed on its top surface, an annular series of V-shaped segments rigidly connected in edge to edge relation, three members mounted in spaced relation on the underside of each segment and resting on said guideways, each being adapted for some degree of universal movement relative to the segment so as to adapt itself automatically to its guideway, and a bearing guiding said segments for rotation around said guideways about a central vertical axis.

4. In a machine tool, the combination of a horizontal bed having guideways formed on its top surface, an annular series of V-shaped segments rigidly connected in edge to edge relation, three members mounted in spaced relation on the underside of each segment and resting on said guideways to provide three points of support for each segment, and a bearing for guiding said segments in revolving about a central vertical axis.

5. In a machine tool, the combination of a bed comprising an annular series of abutting segments rigidly connected together, a pair of annular concentric guideways formed on said segments and extending around the top of said bed, an annular series of segments rigidly connected in edge to edge relation and each slidably supported at two spaced points by the outer one of said guideways and at one point by the inner one of said guideways, and a central bearing connecting said segments and said bed for rotation of the segments around said guideways about a central vertical axis.

6. In a machine tool, the combination of a series of segments rigidly connected together in edge to edge relation to form an annular bed, guideways formed on and extending around the top of said bed, an annular series of segments rigidly connected in edge to edge relation and slidable around said guideways, and a bearing connecting said segments and said bed for rotation of the segments around said guideways about a central vertical axis.

7. In a machine tool, the combination of a series of V-shaped segments rigidly connected together in edge to edge relation to form an annular bed, guideways formed on and extending around the top of said bed, a series of V-shaped segments rigidly connected in edge to edge relation to form an annular table and each supported to slide around said guideways, and a bearing guiding said table for rotation of the latter around a central vertical axis.

8. In a machine tool, the combination of a multiplicity of substantially straight-edged V-shaped segments rigidly connected in edge to edge relation to form a rigid annulus of such segments constituting the body of a table, a bed having a guideway thereon, means connected to said annulus and riding on said guideway for supporting and guiding said annulus, and a bearing connecting said annulus and said bed for rotation of the former around said guideway about a central vertical axis.

9. In a machine tool, the combination of a guideway, a machine element disposed adjacent said guideway, a recess formed in said element and opening toward said guideway, a layer of non-compressible but flowable solid material disposed in the closed end of said recess and confined by the recess walls against any lateral expansion therein upon application of compression load to the material, a sheet fitting snugly in said recess to retain said flowable material in the closed end thereof, and a member received in said recess for some degree of tilting but held against lateral displacement relative to said element, said member having a surface complementing the contour of said guideway and brought into full sliding contact with the latter by the tilting of the member as permitted by flowing of said material.

10. In a machine tool, the combination of a bed having a horizontal guideway around its top surface, a table disposed above said bed and having spaced recesses in the underside thereof opening downwardly, a layer of flowable solid material in the closed end of each of said recesses and confined by the recess walls against any lateral expansion upon application of compression load to the material, and a button resting on and slidable along said guideway and fitting tiltably in one of said recesses, the weight of said table being transmitted to said bed through said material.

11. A machine tool table comprising an annular series of cast metal segments arranged edge to edge and having unfinished edges disposed adjacent but out of contact with each other, pairs of keyways cast in the edges of said segments and spaced along the edges and each comprising a hole in one segment extending substantially perpendicular thereto and a narrower opening at one side of the hole registering with the corresponding opening on the adjacent segment, keys each loosely received in the registering openings of each pair of keyways and having heads loosely received in the holes of such keyways, and fillings cast in said keyways around said keys and connecting the same rigidly to the segments.

12. A machine tool table comprising an annular series of segments arranged edge to edge, pairs of channels formed in the edges of said segments and opening laterally from the edges thereof, the open side of each channel being narrower than the opposite side portion and registering with the narrow open side of the channel on the adjacent segment, keys each loosely received in the registering channels of each pair and having enlarged heads loosely received in wider portions of the channels, and fillings cast in said channels around said keys and connecting the same rigidly to the segments.

13. A machine tool table comprising an annular series of cast metal segments arranged edge to edge and having unfinished edges disposed adjacent but out of contact with each other, the adjacent margins of adjacent segments being formed with channels, and means including keys having unmachined surfaces and disposed in interlocking relation with said keyways for locking the segments rigidly together.

14. A machine tool table comprising an annular series of segments arranged edge to edge, the edges of adjacent segments being out of contact with each other and having pairs of keyways spaced along the edges, keys each loosely received in the keyways of one of said pairs, and fillings cast in said keyways around said keys and connecting the same rigidly to the segments.

15. A machine tool table comprising an annular series of segments arranged edge to edge, the edges of adjacent segments being out of contact with each other and having pairs of keyways spaced along the edges, and keys cast in said keyways and connecting the same rigidly to the segments.

16. A machine tool table comprising an annular series of segments arranged edge to edge and having laterally opening keyways at their adjacent edges with the keyways of different segments registering with each other, and keys cast in said keyways and connecting the same rigidly to the segments.

17. A machine tool table comprising an annular series of cast metal segments of V-shape arranged edge to edge, and keys cast into the adjacent edges of said segments to connect the segments and form a rigid annulus.

18. A machine tool having, in combination, an annular bed providing a central recess and a continuous trough around its periphery adapted to have ice frozen therein to form a level guide surface, a pedestal disposed in said recess and supported independently of said bed, said pedestal providing a bearing concentric with the vertical axis at the center of said guide surface, a horizontal rail journaled at one end on said bearing, a shoe pivoted on the other end of said rail and adapted to rest on said guide surface, and a tool adjustably mounted on said rail and adapted for engagement with the upper surface of said bed.

19. A machine tool having, in combination, an annular bed providing a central recess and a continuous trough around its periphery adapted to have ice frozen therein to form a level guide surface, a pedestal disposed in said recess and supported independently of said bed, a horizontal rail having one end journaled on and supported by said pedestal to turn around an axis perpendicular to said guide surface, means mounted to slide around said guide surface and support the other end of said rail therefrom, and a tool adjustably mounted on said rail and operable to machine the upper surface of said bed.

20. The method of forming the bed of a machine tool which comprises casting a multiplicity of segments each having an upwardly opening arcuate groove, anchoring the segments in an annular series to a foundation with the edges of adjacent segments out of contact but with their grooves registering and connected to form a continuous annular trough, freezing fluid in said trough to provide a level guide surface, supporting a tool on said guide surface, and moving said tool around said surface to machine on the top of the segments an annular surface bearing a fixed positional relation to said guide surface.

21. The method of forming the bed of a machine tool which comprises casting a multiplicity of segments, fastening the segments to a common support with the segments arranged edge to edge in an annular series, freezing fluid in a continuous annular groove on said segments whereby to provide a level guide surface, supporting a tool from said guide surface with the tool positioned to engage said segments, and sliding the tool around said guide surface to machine a surface on the segments.

LUCIEN I. YEOMANS.
DE WITT CLAUSEN.

REFERENCES CITED

The following references are of record in the file of this patent:

UNITED STATES PATENTS

| Number | Name | Date |
|---|---|---|
| 891,199 | Wheeler | June 16, 1908 |
| 2,070,437 | Kjolseth | Feb. 9, 1937 |
| 1,946,835 | Buhr | Feb. 13, 1934 |
| 2,155,680 | Pfauter | Apr. 25, 1939 |
| 2,279,616 | Canterbury | Apr. 14, 1942 |
| 1,848,044 | Blood | Mar. 1, 1932 |
| 873,787 | Riddell | Dec. 17, 1907 |
| 1,309,383 | Yeomans | July 8, 1919 |
| 1,392,778 | McCarty | Oct. 4, 1921 |
| 1,494,099 | Cole | May 13, 1924 |
| 1,498,769 | Wood | June 24, 1924 |
| 1,652,468 | Catlin | Dec. 13, 1927 |